Jan. 30, 1923.
J. A. TRAIN.
DETACHABLE CAMP KIT FOR MOTOR VEHICLES.
FILED MAY 5, 1920.
1,443,397
2 SHEETS-SHEET 1
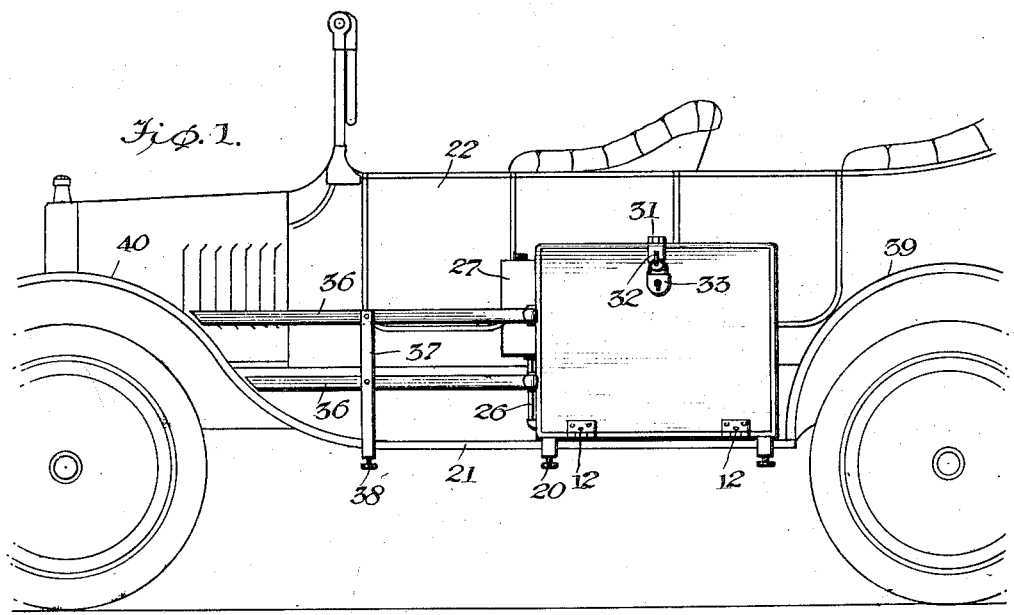
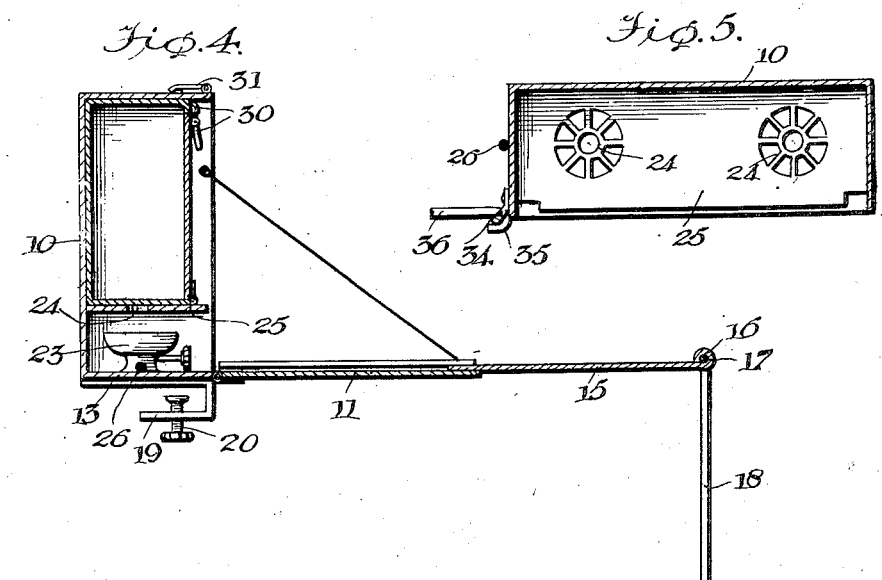
WITNESSES
R. E. Rousseau
INVENTOR
John A. Train,
BY Munn & Co.
ATTORNEYS

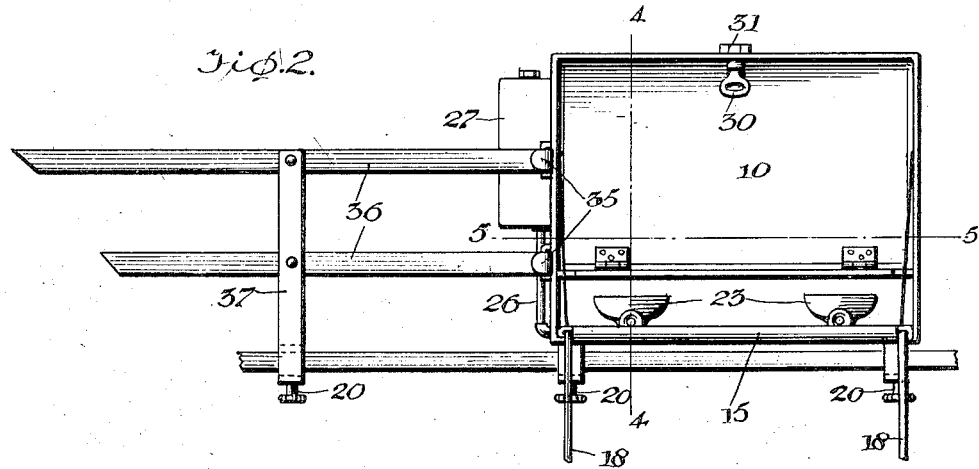
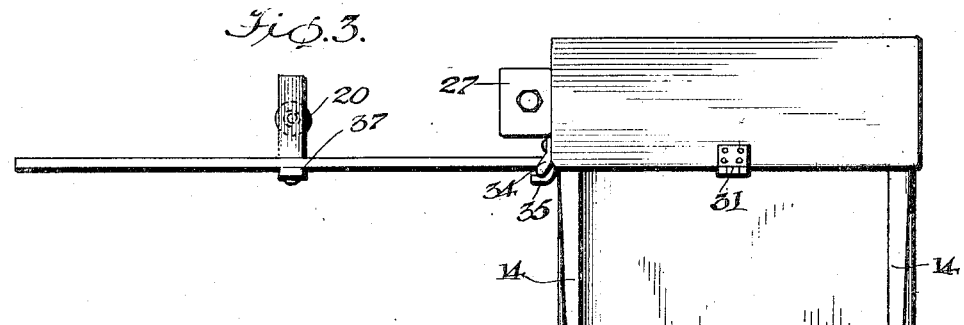
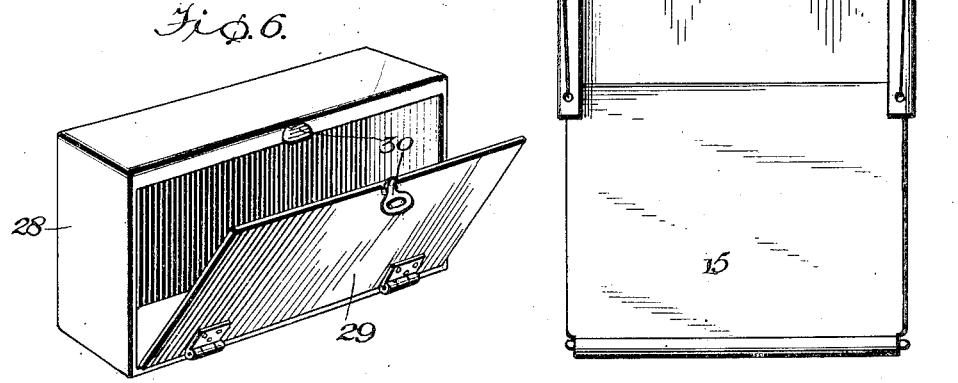

Patented Jan. 30, 1923.

1,443,397

UNITED STATES PATENT OFFICE.

JOHN ABERT TRAIN, OF ST. PAUL, MINNESOTA.

DETACHABLE CAMP KIT FOR MOTOR VEHICLES.

Application filed May 5, 1920. Serial No. 379,048.

*To all whom it may concern:*

Be it known that I, JOHN A. TRAIN, a citizen of the United States, and a resident of St. Paul, in the county of Ramsey and State of Minnesota, have invented certain new and useful Improvements in Detachable Camp Kits for Motor Vehicles, of which the following is a specification.

My present invention relates generally to camp or outing kits and is more particularly an improvement in that type of outfit arranged to be detachably connected to motor vehicles, my object being the provision of an arrangement which may be clamped to the running board of an automobile in such a way as to provide for cooking and the support of cooking and eating utensils as well as to form a luggage holder as hereinafter described.

In the accompanying drawings which illustrate the invention and form a part of this specification, Figure 1 is a side elevation illustrating the practical application of my invention and showing the box or frame closed, Figure 2 is a side view of my improvement with the door dropped to open position, Figure 3 is a top plan view of the parts as shown in Figure 2, Figure 4 is a vertical transverse section taken on line 4—4 of Figure 2, Figure 5 is a horizontal section taken on line 5—5 of Figure 2, and Figure 6 is a detail perspective view of the oven removed.

Referring now to these figures my invention proposes a camp kit and the like including a rectangular casing 10 having at one side a drop door 11 whose lower edge is hinged by hinges 12 to the lower edge of the open side of the casing 10 at the forward edge of its base 13, and whose side edges have upwardly and inwardly turned side flanges 14 forming guides or runners for the side edge of an extension plate 15. This extension plate is particularly shown in Figures 3 and 4 and is normally positioned coextensive with the inner surface of the drop door 11, its outer edge being curved at 16 around the intermediate cross bar 17 of a U-shaped frame, the extensions 18 of which may be rotated from a horizontal position inwardly along the door 11 to a vertical position such as seen in Figures 2 and 4, in which latter position they engage the ground at their lower free ends and form legs to support the outer edge of the plate 15 when the latter is drawn outwardly in its guides or runners to the extended position shown in Figures 3 and 4 so as to form a table.

Attached to the lower surface of the base 13 at spaced points therealong are rearwardly opening U-shaped clamping brackets 19 through the lower portions of which clamping screws 20 are threaded, so that the casing as a whole, with its several parts, may be conveniently and readily secured to and removed from one of the side running boards 21 of an automobile 22 of any suitable character.

Upon the base 13 are supported burners 23, positioned below apertured grate portions 24 in a horizontal partition 25 mounted in the casing parallel with and above the base 13 and which thus forms a cooking or heating plate in use. The burners are fed by a pipe 26 from a fuel tank 27 secured upon one side wall of the casing exteriorly of the latter as seen in Figures 1 and 2, leaving the space within the casing 10 entirely free above its partition 25 to receive an interfitting rectangular casing 28 forming an oven and also constituting a support and holder for cooking and eating utensils in transportation. This oven 28 as particularly seen in Figure 6 is preferably provided with a drop hinged front door 29 normally held in closed position by catches 30, and is removed from the casing 10 when the partition 25 is utilized in practice as a cooking plate.

The top wall of the casing 10 is preferably provided with a hasp 31 for engagement over a staple 32 carried by the drop door 11 and adapted to receive a lock 33 so that the casing as a whole may be securely fastened against unwarranted opening, between periods of use.

At one side, the casing 10 has angular apertured brackets 34 engaged by the curved inner ends 35 of a pair of horizontally outstanding and vertically spaced luggage rails 36, rigidly connected intermediate their ends to vertically spaced points of an upstanding bracket 37 having a lower U-shaped clamp and clamping screw 38 for engagement with the running board 21 similar to one of the brackets and screws 19 and 20 of the casing.

Thus with the casing 10 secured to one side running board 21 adjacent to one of the wheel fenders, for instance the rear fender 39, the luggage rails 36 may be disposed to extend to a point adjacent to the front fender 40 as seen in Figure 1 so that with the bracket 37 secured as shown, a luggage receiving space is formed between the front fender 40 and the forward side wall of the casing 10, and between the side of the vehicle body and the luggage rails 36 for the convenient reception of blankets, small tents and other camping or outing paraphernalia.

It is obvious that my invention thus provides a convenient apparatus capable of ready attachment in and removal from the operative position shown, as well as one which will be comparatively inexpensive, may be readily manipulated, and will be durable and effective in use.

I claim:

1. A device of the character described including a casing having a hinged drop door provided with inturned side flanges, and an extensible plate the side edges of which are movable in guided relation in the said flanges, said plate having a movable frame at its outer edge, portions of which frame form supporting legs for the door and its plate when the latter is extended.

2. A camp kit for automobiles including a casing having lower clamps and a drop door hinged to the lower portion thereof, and an extension plate slidably mounted in connection with the said door and carrying foldable supporting legs at its outer edge.

3. A camp kit for automobiles including a casing having lower clamps and a drop door hinged to the lower portion thereof, and an extension plate slidably mounted in connection with the said door and having a movable U-shaped frame around the cross bar of which its outer edge is curved, the extensions of said frame forming supporting legs for the door and plate when the latter is extended.

JOHN ABERT TRAIN.